G. H. DU SELL.
TOOL HOLDING DEVICE.
APPLICATION FILED FEB. 9, 1920.
1,391,723. Patented Sept. 27, 1921.
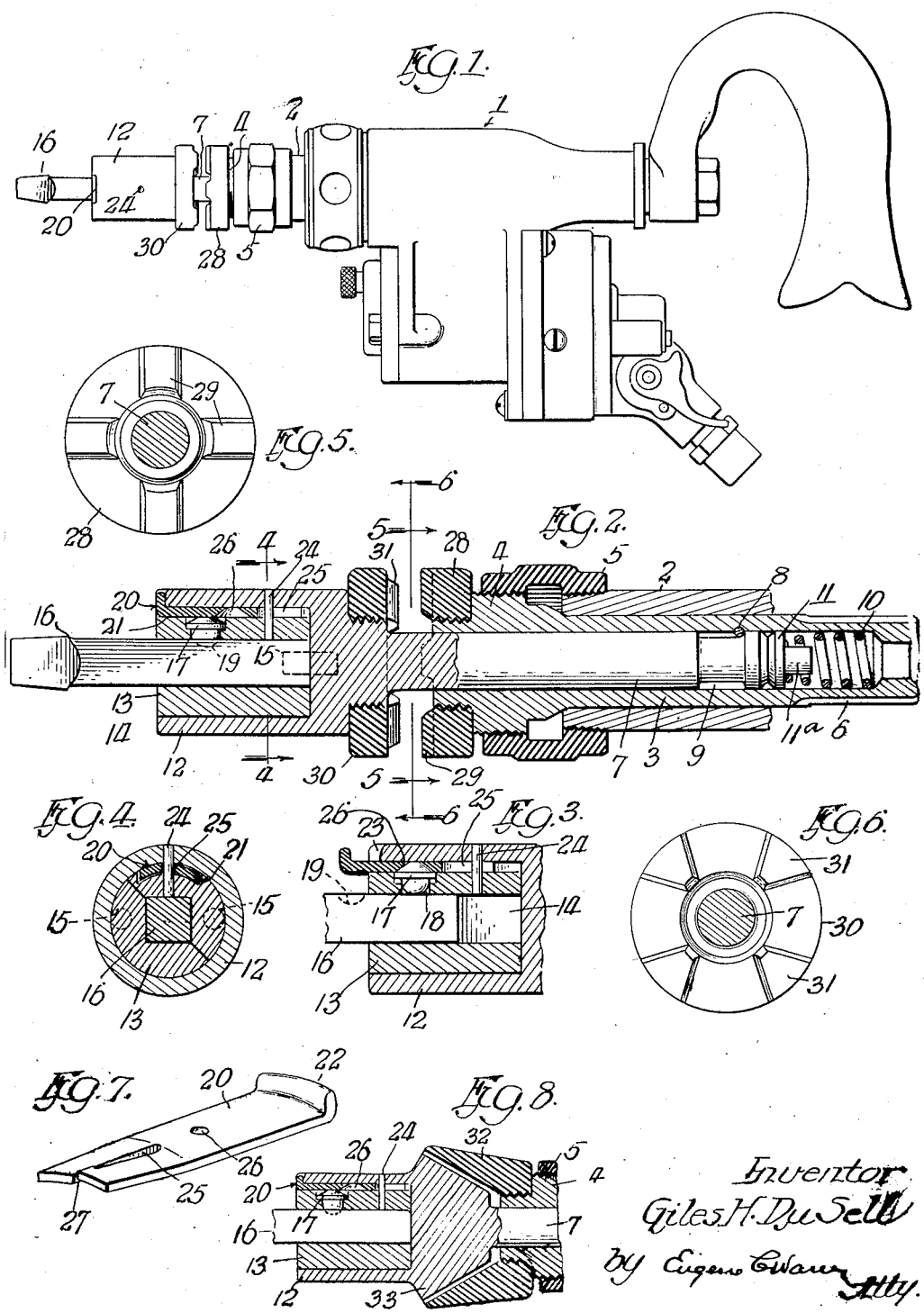

UNITED STATES PATENT OFFICE.

GILES H. DU SELL, OF CHICAGO, ILLINOIS, ASSIGNOR TO INDEPENDENT PNEUMATIC TOOL COMPANY, OF CHICAGO, ILLINOIS, A CORPORATION OF DELAWARE.

TOOL-HOLDING DEVICE.

1,391,723.  Specification of Letters Patent.  Patented Sept. 27, 1921.

Application filed February 9, 1920. Serial No. 357,187.

*To all whom it may concern:*

Be it known that I, GILES H. DU SELL, a citizen of the United States, residing at Chicago, in the county of Cook and State of Illinois, have invented new and useful Improvements in Tool-Holding Devices, of which the following is a specification.

This invention relates to a tool holding device whereby a screw driver bit or socket wrench, in particular, may be readily connected to a power driven member, such as the rotary spindle of a portable power driven tool, for setting or driving home screws and nuts by power.

Among the objects of my invention is to provide a construction having coacting means, such as a clutch, between the power driven member and the tool holding device, so that the latter may be connected with the former at the will of the operator when a screw or nut is to be set or rotated and driven home, and be released from said power driven member the instant the screw or nut is driven home, and thus allow the power driven member to run continuously so that it need not be stopped and started for each screw or nut to be operated on.

The invention consists further in the matters hereinafter described and more particularly pointed out in the appended claims.

In the accompanying drawings:

Figure 1 is a side view of a portable power driven tool of the type provided with a rotary spindle and having applied thereto, as an attachment, a device of my invention;

Fig. 2 is an enlarged longitudinal sectional view of said device and that portion of the spindle of the power driven tool with which my device has connection;

Fig. 3 is a longitudinal sectional view through the outer end of the attachment and showing the locking member or slide in unlocking position;

Figs. 4, 5, and 6 are transverse sectional views taken on lines 4—4, 5—5, and 6—6, respectively, of Fig. 2;

Fig. 7 is a perspective view of the locking member; and

Fig. 8 is a fragmentary longitudinal sectional view of another form of clutch device, to be hereinafter described.

In the drawings, I have shown the tool holding device of my invention in the form of an attachment for portable power driven tools of the type having a spindle rotated by the motor of the tool. Some tools of this character are actuated pneumatically, while others are operated electrically, and my device is applicable to either or to any other type of power driven tool having a rotary spindle or equivalent part. For the purpose of illustration, I have shown in the drawings my device applied to a portable tool of the pneumatically actuated type, and said tool is indicated as a whole by 1, has a spindle 2 projecting outward beyond one end of the same, and is rotated by the pneumatic motor of the tool, as usual in tools of this type.

The spindle 2 is hollow, has an open outer end, and into the same is inserted a sleeve or socket 3. The latter extends beyond the spindle 2 and has an enlarged outer end 4 connected with the spindle 2 by a nut 5. The inner end of the socket 3 is provided with one or more key slots 6, fitting keys (not shown) in the spindle 2, so that the latter and the socket will rotate in unison. Extending into the socket 3 is a holder or spindle 7, slidably and rotatably mounted therein and held from dropping out of the same by a cross-pin 8 carried by the socket 3 and extending transversely through an annular groove 9 at the inner end of said spindle 7. A coiled spring 10 is located in the socket 3 beyond the inner end of the spindle 7 and bears against a thrust plug 11 abutting against the opposed end of said spindle. Said plug has a short shank 11ª fitting friction tight into the adjacent end of the spring, and the coil at the opposite end of the spring is increased in diameter to fit snugly in the socket 3. The spring and plug are thus held against rotation when in service and are also held from dropping out of the socket 3 when the spindle 7 is removed therefrom upon disassembling the device.

The holder or spindle 7 projects beyond the socket 3, as shown, and is there provided with a tool holding chuck, formed in part by the enlarged head 12 at the outer end of said spindle 7. Said head 12 has a cylindric recess to receive a two-part block or member 13 having a rectangular hole 14. The member 13 is pressed friction tight into the head 12, and is further held from rotation by one or more keys or dowel pins 15. The hole 14 is of a size to receive the rectangular shank 16 of the tool or implement to be used with my device. This may be a screw driver bit, as shown in the drawings, or a socket wrench, or such other implement as may be used. To releasably hold the shank 16 in the chuck, I provide a plug 17, slidably held in a counter-bored hole 18 in the member 13, as shown. The inner end of the plug 17 is rounded to fit in a concave recess 19 in the shank 16 when the parts register, as shown in Figs. 2 and 8. To hold the plug 17 from outward movement when in said recess 19, I provide a locking member, preferably in the form of a relatively flat plate 20 slidable endwise in a guide-way 21 in the member 13. Said slide-way 21 is curved transversely to conform to the shape of the member 13, and the plate 20 has a like curvature and when in the slide-way fits between the member 13 and the inner surface of the head 12, as clearly shown in Fig. 4. The plate 20 has a limited sliding movement in both directions, the inward movement being limited by a rib or projection 22 at the outer end of the plate contacting with the outer edge of the head in a recess 23 formed in such edge to receive such part. The outward movement is limited by a fixed pin 24 carried by the head 12 or the member 13 or both and extending inward through an elongated slot 25 in the plate 20, adjacent its inner end, as shown. The plate 20 is provided between its ends with a conical socket or recess 26, and the outer end of the plug 17 is given a like shape to fit into the same when such parts register. When the plate 20 is pulled outward as far as permitted by the pin 24, the recess 26 will register with the plug 17, and then an outward pull on the shank 16 to remove the same from the chuck will raise or move the plug 17 outward from the recess 19 and release the shank, the outer end of the plug at such time entering the recess 26, as shown in Fig. 3.

To lock the shank 16 in the chuck, the shank 16 is inserted into the hole 14 until the recess 19 registers with the plug 17, whereupon the latter will drop or can be moved into said recess 19 by sliding the plate 20 inward, the coacting inclined surfaces of the parts acting to accomplish this, and the plug 17 is held from movement out of locking engagement with said shank 16 by the plate 20, as shown in Fig. 2. To prevent the plate 20 from sliding accidentally, the inner end thereof is split or severed, as at 27, and the severed portions bent slightly upward and downward, respectively, so as to frictionally engage the parts between which the plate is inserted.

Secured to the outer end of the main socket 3 is a clutch member 28 having a plurality of clutch teeth 29, and secured to the spindle 7 at the rear of the head 12 is a co-operating clutch member 30 having clutch teeth 31. The spring 10 normally holds the clutch members 28 and 30 separated, as shown in Figs. 1 and 2, and when the parts occupy such positions, the holder or spindle 7 is disconnected from the main spindle 2, and the former is not rotated by the latter during the operation of the motor of the tool 1. When a screw driver bit is held in the chuck 12, it is engaged with the kerf of a screw and the tool as a whole pressed against the same, whereupon the spindle 7 is moved inward against the spring 10 until the clutch members 28 and 30 engage, and then the spindle 7 is connected to the spindle 2 and both rotated together to rotate and drive the screw home. Should a socket wrench be held by the chuck 12, the same operation is followed, and the nut engaged by the wrench will be turned and driven home when the clutch members are engaged, as is apparent. The teeth of the clutch members 28, 30 have their side edges beveled, as shown in the drawings, and arranged at such an angle to allow them to readily slip apart when the screw or nut, as the case may be, has been properly drawn up or set by the operation of the tool, and when this happens the spring 10 forces the spindle 7 forward to disengage the clutch members so that no further rotation is imparted to the spindle 7, although the main spindle 2 and the socket 3 may continue to rotate. Thus, the tool 1 after being started may be allowed to run continuously and need not be stopped each time that a screw or nut, as the case may be, is to be operated on, or be stopped when the screw or nut has been set or driven home. Manifestly, with my device much time is saved, in that it is not necessary to start and stop the tool for each and every nut or screw to be operated upon, and, further, the tool holder is started and stopped just when required.

Instead of using clutch members having jaw teeth, as described, I may use any other form to accomplish the objects sought; and in Fig. 8, I have shown clutch members of the friction cone type, wherein the one 32 is the male cone and the other 33 is the female cone. As in the first form of device, these clutch members will split with respect to each other and become separated the instant the screw or nut is set.

While I have shown and described in detail a tool holding device embodying the features of my invention, it is to be of course understood that the details of construction and arrangement of parts shown may be variously changed and modified without departing from the spirit and scope of my invention.

I claim as my invention:

1. A device of the character described, comprising a sleeve adapted to be connected with a rotary power driven member, a tool holding chuck having a spindle extending into said sleeve from the outer end thereof and being slidably and rotatably mounted therein, opposed clutch members, one on the outer end of said sleeve and the other on said chuck at the outer end of said spindle, and resilient means in said sleeve and acting on said spindle to normally hold said clutch members disengaged, said clutch members having clutch teeth connecting the sleeve and chuck together during the rotation of said sleeve when the clutch members are moved into engagement by the chuck being moved toward the sleeve on forcing the tool carried by the chuck against the work, said clutch teeth having their engaging side faces inclined at such angles that the clutch members will slip relatively to each other when the chuck is held against rotation while the clutch members are engaged.

2. A device of the character described, comprising a sleeve adapted to be connected with a rotary power driven member, a tool holding chuck having a spindle slidably and rotatably mounted in said sleeve, coacting clutch members on the sleeve and chuck, respectively, a thrust plug in said sleeve at the inner end of said spindle and bearing against the same, and a spring in said sleeve for holding said plug against said spindle and frictionally engaged with said plug and sleeve, said spring acting to normally hold said clutch members disengaged, but permitting the clutch member on said chuck to be moved into engagement with the clutch member on said sleeve upon the movement of the chuck toward said sleeve by forcing the tool carried by said chuck against the work.

3. A device of the character described, comprising a sleeve adapted to be connected with a rotary power driven member, a tool holding chuck having a spindle rotatably mounted in said sleeve and provided with an elongated annular groove, a pin fixed in said sleeve and extending across said groove for permitting the spindle to slide endwise in said sleeve, coacting clutch members on said sleeve and chuck, respectively, and a spring in said sleeve and acting against said spindle to normally hold said clutch members disengaged, but permitting the clutch member on said chuck to be moved into engagement with the clutch member on said sleeve upon the movement of said chuck toward said sleeve by forcing the tool carried by said chuck against the work.

In testimony that I claim the foregoing as my invention, I affix my signature, this 3 day of February, A. D. 1920.

G. H. DU SELL.